US008965814B1

(12) United States Patent
Rangan (10) Patent No.: US 8,965,814 B1
(45) Date of Patent: Feb. 24, 2015

(54) SELECTION OF MOST EFFECTIVE MACHINE LEARNING KERNEL FROM A TRAINING SET OF DOCUMENTS

(75) Inventor: Venkat Rangan, Los Altos Hills, CA (US)

(73) Assignee: Symantec Corporation, Mountain View, CA (US)

( * ) Notice: Subject to any disclaimer, the term of this patent is extended or adjusted under 35 U.S.C. 154(b) by 372 days.

(21) Appl. No.: 13/421,226

(22) Filed: Mar. 15, 2012

(51) Int. Cl.
*G06N 5/02* (2006.01)

(52) U.S. Cl.
CPC .......................................... *G06N 5/02* (2013.01)
USPC ............................................................ 706/12

(58) Field of Classification Search
CPC ................................ G06N 99/005; G06N 5/02
USPC .......................................................... 706/12
See application file for complete search history.

(56) References Cited

U.S. PATENT DOCUMENTS

2005/0071300 A1* 3/2005 Bartlett et al. .................. 706/12

OTHER PUBLICATIONS

Cortes et al., Kernal Learning: Automatic Selection of Optimal Kernals, Dec. 13, 2008, 5 pages.
Ben-David, Shai, The sample Complexity of Learning the Kernal, NIPS Kernel Learning Workshop, 2008, 18 pages.
Chapelle, et al., Second order optimization of kernal parameters, 2008, 4 pages.
Cortes et al., Learning Sequence Kernals, 2008, 9 pages.
Balcan et al., Learning with Multiple Similarity Functions, 2008, 4 pages.
Argyriou, Andreas, Muti-Task Learning via Matrix Regularization, 2008, 26 pages.
Guyon, Isabelle, Feature selection methods from correlation to causality, NIPS 2008 workshop on kernal learning, 2008, 35 pages.
Srebro, et al., Learning Bounds for Support Vector Machines with Learned Kernals, 19th Annual Conference on Learning Theory, Jun. 2006, 4 pages.
Kloft et al., Non-sparse Multiple Kernal Learning, Fraunhover Institute First, Berlin, 2008, 4 pages.
Gehler et al., Infinite Kernal Learning, NIPS workshop on Automatic Selection of optimal kernals, Dec. 13, 2008, 36 pages.
Shawe-Taylor, John, Kernal Learning for Novelty Detection, NIPS Workshop Kernal Learning: Automatic Selection of Optimal Kernals, Dec. 2008, 45 pages.
Ganti et al., Hyperkernal Based Density Estimation, In NIPS Workshop on Automatic Selection of Optimal Kernel, 2008, 4 pages.

(Continued)

*Primary Examiner* — Li-Wu Chang
*Assistant Examiner* — Ola Olude Afolabi
(74) *Attorney, Agent, or Firm* — Lowenstein Sandler LLP (57) ABSTRACT

A server computing system selects a machine learning kernel from a plurality of machine learning kernels using a plurality of training documents. The server computing system identifies a plurality of testing documents from a plurality of electronic discovery documents based on the plurality of training documents. For each of the plurality of machine learning kernels and for each testing document in the plurality of testing documents, the server computing system determines a class of the testing document using a default value for each of a plurality of parameters for the machine learning kernel and evaluates a goodness of fit of the machine learning kernel for the testing document. The server computing system selects a machine learning kernel from the plurality of machine learning kernels and determines a value for at least one of the plurality of parameters for the selected machine learning kernel using a goodness of fit test.

20 Claims, 5 Drawing Sheets (56) References Cited

OTHER PUBLICATIONS

Howard et al., Learning Large Margin Mappings, Kernel Learning Workshop, NIPS 2008, 4 pages.

Mosci et al., a new algorithm to learn an optimal kernal based on Fenchel duality, 2008, 4 pages.

Ouyang et al., Learning Nearest-Neighbor Classifiers with Hyperkernals, 2008, 4 pages.

Vasiloglou et al., Learning Isometric Separation Maps, 2009, 4 pages.

\* cited by examiner

SELECTION OF MOST EFFECTIVE MACHINE LEARNING KERNEL FROM A TRAINING SET OF DOCUMENTS

TECHNICAL FIELD

Embodiments of the present invention relate to electronic discovery, and more particularly, to a technique for selection of a most effective machine learning kernel from a training set of documents.

BACKGROUND

Reviewers that review data sets, for example, during electronic discovery (e-discovery), may encounter data sets that contain millions of electronic discovery documents. Each of the electronic discovery documents may need to be evaluated by the reviewers and a determination may be made of a class or category for the documents. Categories may include confidential, not confidential, relevant, not relevant, privileged, not privileged, responsive, not responsive, etc. Manually reviewing the millions of electronic discovery documents is impractical, expensive, and time consuming.

Automated predictive coding using machine learning is a technique commonly implemented to review and classify a large number of electronic discovery documents. Some approaches of machine learning use Support Vector Machine (SVM) technology to analyze a subset of the electronic discovery documents, called a training set, and applies the machine learning from the analysis to the remaining electronic discovery documents.

A SVM implements a machine learning kernel, and is based on the concept of decision planes that define decision boundaries. A decision plane separates documents based on their class memberships (e.g., confidential, not confidential, relevant, not relevant, privileged, not privileged, responsive, not responsive, etc.) and rearranges the documents from a non-linear space to a linear space. For example, documents can be classified by drawing a line that defines a class boundary. On a first side of the boundary, all documents belonging to a first class (e.g., confidential) lie and on a second side of the boundary, all documents belonging to a second class (e.g., not confidential) lie. After the training phase is completed, new documents that were not part of the training can be automatically classified. Any unclassified document can be classified by determining which side of the boundary it falls on. If the document falls to the first side, it can be classified as belonging to the first group, and if the document falls to the second side, it can be classified as belonging to the second group.

A variety of machine language kernels can be implemented by a SVM to classify electronic discovery documents. The machine language kernel that is implemented determines the shape of the line that needs to be drawn to define class boundaries. Depending on the electronic discovery documents to be trained with, one machine language kernel (e.g., RBF) may be better suited than another machine language kernel (e.g., linear). A machine learning kernel includes a predefined kernel function and a plurality of parameters. The machine learning kernel applies the predefined kernel function to the electronic discovery documents. The application of the predefined kernel function can be modified using the parameters.

A current approach selects a combination of machine learning kernels to categorize the electronic discovery documents. However, the performance of the combination of machine learning kernels may not be effective and may introduce a high error rate for certain electronic discovery documents. Moreover, it may be difficult for the reviewer of documents to select the parameters to use for the combination of machine learning kernels. An additional challenge is the combination of kernels and their corresponding parameters is very large, so an exhaustive search of all combinations and an evaluation of which one is superior is very time consuming.

Another current approach analyzes a plurality of parameters for an RBF machine learning kernel. However, the RBF machine learning kernel may not be the most effective machine learning kernel for all electronic discovery documents.

SUMMARY

An exemplary system may include a server computing system programmed to select a machine learning kernel from a plurality of machine learning kernels using a plurality of training documents. In one embodiment, the server computing system identifies a plurality of testing documents from a plurality of electronic discovery documents based on the plurality of training documents. For each of the plurality of machine learning kernels and for each testing document in the plurality of testing documents, the server computing system determines a class of the testing document using a default value for each of a plurality of parameters for the machine learning kernel and evaluates a goodness of fit of the machine learning kernel for the testing document. The server computing system selects a machine learning kernel from the plurality of machine learning kernels. The server computing system determines a value for at least one of the plurality of parameters for the selected machine learning kernel using a goodness of fit test.

In one embodiment, the plurality of machine learning kernels comprises at least two of a linear kernel, a polynomial kernel, a radial basis function (RBF) kernel, a sigmoid kernel, a three nearest neighbor kernel, a tangent distance kernel, a LeNet kernel, and a translation invariant kernel.

In one embodiment, the plurality of parameters is at least one of nu, width, degree, coefficient, epsilon, and cost.

In one embodiment, the server computing system identifies the plurality of testing documents by determining, for each of the plurality of training documents and for each of the plurality of electronic discovery documents, whether the electronic discovery document is similar to the training document and, upon determining that the electronic discovery document is similar to the training document, adding the electronic discovery document to the plurality of testing documents.

In one embodiment, the server computing system determines whether the electronic discovery document is similar to the training document by extracting a plurality of features of the training document and determining that the document is a near-duplicate of the training document based on the extracted plurality of features.

In one embodiment, the server computing system determines whether the electronic discovery document is similar to the training document by extracting a plurality of features of the training document and determining that the document is a concept cluster of the training document based on the extracted plurality of features.

In one embodiment, the server computing system selects a machine learning kernel from the plurality of machine learning kernels by determining an overall goodness of fit for each of the plurality of machine learning kernel, comparing the overall goodness of fit for each of the plurality of machine learning kernels, and selecting the machine learning kernel with the greatest overall goodness of fit.

In one embodiment, the server computing system determines the overall goodness of fit by summing a variance for each testing document in the plurality of testing documents for the machine learning kernel, wherein the variance for each testing document is based on the goodness of fit of the machine kernel for the testing document, and applying a goodness of fit test to the variance.

In one embodiment, the server computing system determines a value for at least one of the plurality of parameters for the selected machine learning kernel using a goodness of fit test by determining, for each parameter value of a plurality of parameter values for each parameter of the plurality of parameters, a parameter goodness of fit value for the selected machine learning kernel using the parameter value for the parameter, and selecting a parameter value from the plurality of values for each parameter of the plurality of parameters, wherein a parameter goodness of fit value corresponding to the selected parameter is greater than a parameter goodness of fit value for the remaining plurality of parameter values for the parameter.

In additional embodiments, methods for performing the operations of the above described embodiments are also implemented. Additionally, in embodiments of the present invention, a non-transitory computer readable storage medium stores methods for performing the operations of the above described embodiments.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Embodiments of the invention are directed to a method and system for selecting a most effective machine learning kernel from a training set of documents.

Reviewers or an administrator may have millions of electronic discovery documents to review in relation to electronic discovery. Automated coding using machine learning can be used to assist in reviewing and classifying a large number of electronic discovery documents. In order to classify a large number of electronic discovery documents, a subset of the electronic discovery documents (e.g., 1000 to 10000 documents) may be selected as a set of training documents for the machine learning. The training documents may be reviewed by expert reviewers and categorized into one or more classes.

The training documents may be used to determine the most effective machine learning kernel from a variety of machine language kernels. The most effective machine learning kernel may be the machine learning kernel that best classifies the training documents and the remaining electronic discovery documents. Initially, the most effective machine learning kernel may be selected using default parameters values for the machine learning kernel. The parameters for the selected machine learning kernel may then be adjusted, such that the selected machine learning kernel is at is most effective.

In order to determine the machine learning kernel that will best classify the electronic discovery documents, a set of testing documents is selected, or identified, from the electronic discovery documents based on the training documents. The set of testing documents are documents that are determined to be near duplicate and/or concept cluster documents for each of the training documents. A near duplicate document is a document that is almost a duplicate of the training document (e.g., nearly identical). A concept cluster document is not necessarily a near duplicate of a training document, but is about the same concept, same subject, or same topic as the training document. By selecting the testing documents to be near duplicate and/or concept cluster documents of the training documents, the class of each of the testing documents may be known, because it may be the same as the class of the training document that the testing document was found to be a near-duplicate and/or concept cluster of. Therefore, the effectiveness of the machine learning kernel can be more easily measured.

Each machine learning kernel is used to predict the class for each of the testing documents and a goodness of fit of the machine learning kernel is determined based on the class predictions. The machine learning kernel with the best goodness of fit is selected as the most effective machine learning kernel to review the remainder of the documents outside of the set of training documents and the set of testing documents.

Figure 1:
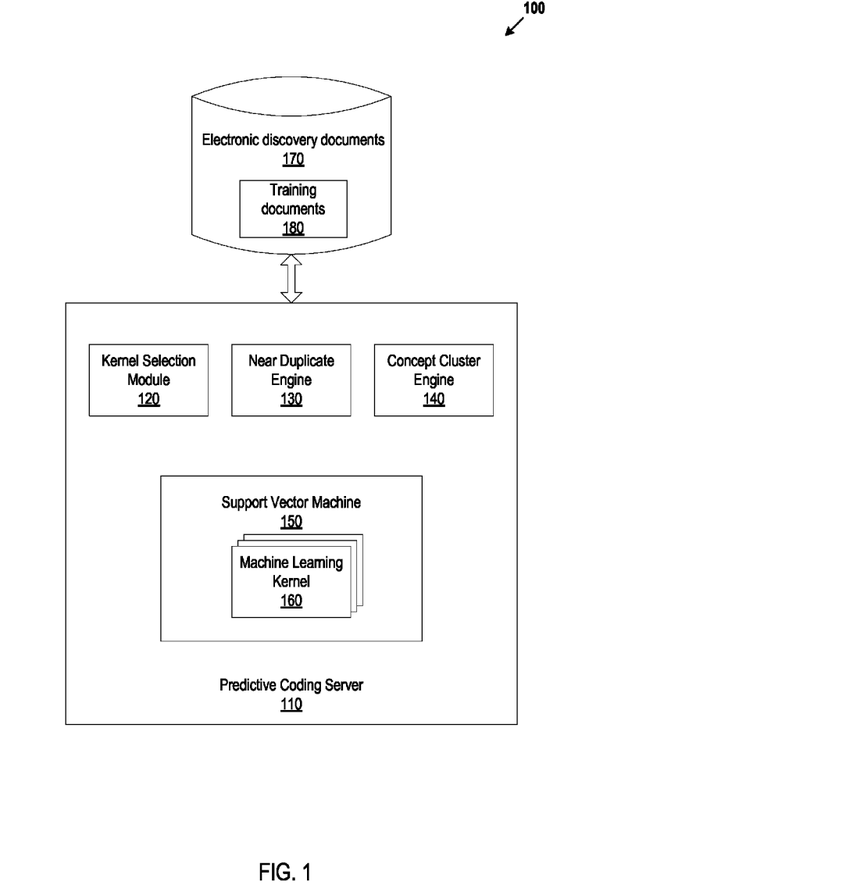
FIG. 1 illustrates exemplary system architecture, in accordance with various embodiments of the present invention.

FIG. 1 illustrates exemplary system architecture 100 in which embodiments can be implemented. The system architecture 100 includes a predictive coding server 110 and an electronic discovery documents data repository 170.

Predictive coding server 110 may be a rackmount server, a router computer, a personal computer, a portable digital assistant, a mobile phone, a laptop computer, a tablet computer, a camera, a video camera, a netbook, a desktop computer, a media center, or any combination of the above. In one embodiment, the secure administration server 110 is deployed as a network appliance (e.g., a network router, hub, or managed switch).

Electronic discovery documents data repository 170 is a persistent storage that is capable of storing data that is collected from data sources. Examples of data sources can include, and are not limited to, desktop computers, laptop computers, handheld computers, server computers, gateway computers, mobile communications devices, cell phones, smart phones, or similar computing device. In some embodiments, electronic discovery documents data repository 170 might be a network-attached file server, while in other embodiments electronic discovery documents data repository 170 might be some other type of persistent storage such as an object-oriented database, a relational database, and so forth.

The data in the electronic discovery documents data repository 170 can include electronic discovery documents that need to be reviewed and classified. Examples of electronic discovery documents can include, and are not limited to, electronic discovery documents which have been divided into a set of training documents that have been selected by an administrator (document reviewer, etc), a plurality of testing documents that have been selected by the predictive coding server 110, a remainder of electronic discovery documents that need to be classified, and any other electronically stored information that can be associated with electronic discovery documents, etc.

During operation of system 100, a predictive coding server 110 is used to classify the electronic discovery documents in electronic discovery documents data repository 170. The electronic discovery documents stored in electronic discovery documents data repository 170 can include training documents 180. Training documents 180 can be a subset of the electronic discovery documents that are selected for machine learning. Using the training documents 180, an administrator or reviewer can classify each training document (e.g., confidential, not confidential, relevant, not relevant, privileged, not privileged, responsive, not responsive, etc.). Once training documents 180 are classified, a most effective machine learning kernel can be selected by the predictive coding server 110.

In one embodiment, predictive coding server 110 includes a kernel selection module 120, a near duplicate engine 130, a concept cluster engine 140, and a support vector machine 150. In alternative embodiments, one or more of the kernel selection module 120, the near duplicate engine 130, the concept cluster engine 140, and the support vector machine 150 run on different machines.

Kernel selection module 120 can select the most effective machine learning kernel using training documents 180. Kernel selection module 120 can identify testing documents based on training documents 180. In one embodiment, kernel selection module 120 identifies the testing documents by evaluating each training document 180 to determine whether any of the electronic discovery documents 170 are similar to the training document. In an alternate embodiment, kernel selection module 120 determines the testing documents by submitting electronic discovery documents 170, including training documents 180 and the remaining electronic discovery documents (outside of the training documents 180), to near duplicate engine 130 and concept cluster engine 140.

Near duplicate engine 130 can determine if any of the electronic discovery documents 170 are near-duplicates of any of training documents 180. Near duplicate engine 130 can send the determination of which electronic discovery documents are near duplicates of which training documents to kernel selection module 120. For a complete description of the function of a near-duplicate engine, reference is made to application Ser. No. 13/028,841, which is hereby incorporated by reference.

Concept cluster engine 140 can determine if any of the electronic discovery documents 170 are in the same concept-cluster of any of training documents 180. Concept cluster engine 140 can send the determination of which electronic discovery documents are concept clusters of which training documents to kernel selection module 120. For a complete description of a concept cluster engine, reference is made to application Ser. No. 13/028,826, which is hereby incorporated by reference.

Kernel selection module 120 can evaluate each machine learning kernel 160 by sending the testing documents to support vector machine 150. Kernel selection module 120 can receive a class for each testing document from support vector machine 150.

Support vector machine 150 can include machine learning kernels 160. Each machine learning kernel 160 can implement a different predefined kernel function using a default set of parameters, and determines how to classify each testing document received from kernel selection module 120 using machine learning based on training documents 180. Machine learning kernel 160 can determine a class for a testing document received from kernel selection module 120, and send the class for the testing document to kernel selection module 120. The classes used by machine learning kernel 160 can be based on the classes that categorize the plurality of training documents. In some embodiments, an SVM engine within support vector machine 150 can be the combination of a machine learning kernel 160, the parameters for the machine learning kernel 160, and the training documents that have been used to train the support vector machine 150.

Kernel selection module 120 can determine a goodness of fit of each evaluated machine learning kernel 160 for each testing document. The goodness of fit of the machine learning kernel may be determined by determining the centroid of the testing documents, determining the distance of the point representing the testing document from the centroid, and applying a goodness of fit test to the distance. The goodness of fit test can measure the goodness of fit as the variance (or discrepancy) between class values predicted by the machine learning kernel 160 and the class values predicted by the testing document's classification based on its relation to a training document (near duplicate or concept cluster). Kernel selection module 120 can perform an operation (e.g., add) the variance for each testing document to determine an overall goodness of fit for each machine learning kernel 160.

Kernel selection module 120 can then compare the overall goodness of fit for each of machine learning kernels 160 and select the most effective machine learning kernel 160. In some embodiments, the most effective machine learning kernel 160 is the machine learning kernel with the greatest overall goodness of fit value. Kernel selection module 120 can then select a value for one or more parameters for the most effective machine learning kernel 160 to optimize the most effective machine learning kernel 160. The values for the parameters can be selected based on a goodness of fit test for each value of the parameters.

Figure 2:
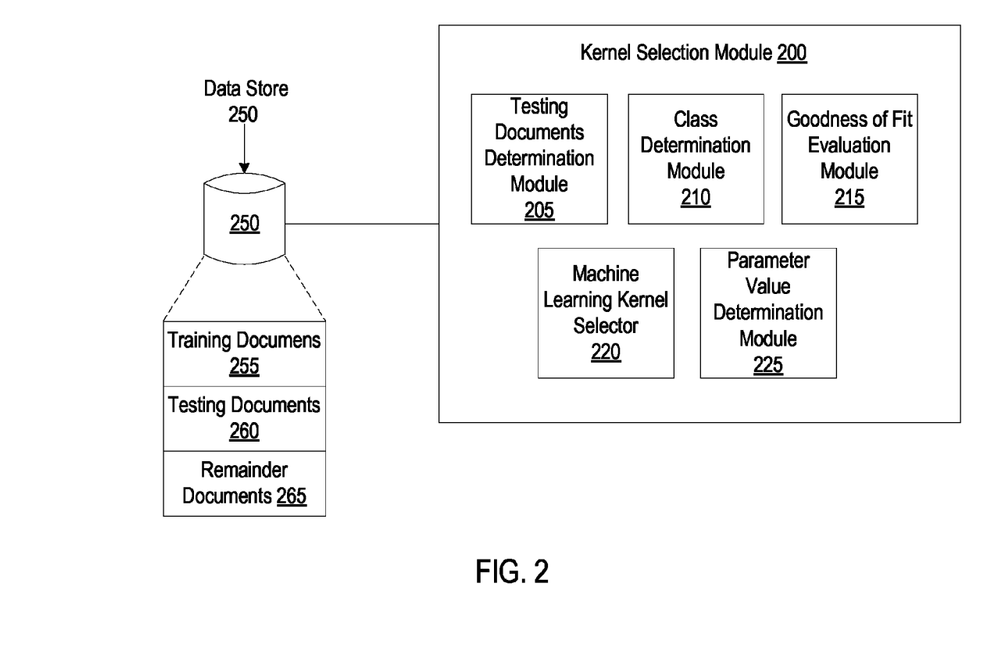
FIG. 2 is a block diagram of a kernel selection module, in accordance with an embodiment.

FIG. 2 is a block diagram of a kernel selection module 200, in accordance with one embodiment of the present invention. The kernel selection module 200 includes a testing documents determination module 205, a class determination module 210, a goodness of fit evaluation module 215, a machine learning kernel selector 220, and a parameter value determination module 225. Note that in alternative embodiments, the functionality of one or more of the testing documents determination module 205, the class determination module 210, the goodness of fit evaluation module 215, the machine learning kernel selector 220, and the parameter value determination module 225 may be combined or divided.

Testing documents determination module 205 can identify testing documents based on training documents 255. In one embodiment, testing documents determination module 205 identifies the testing documents by submitting training documents 255 and remainder documents 265 to a near duplicate engine (not shown) and/or a concept cluster engine (not shown), and receiving testing documents from the engine(s). In an alternate embodiment, testing documents determination module 205 can identify the testing documents by evaluating each training document 255 to determine whether any of remainder documents 265 are similar to the training document 255. In this embodiment, testing documents determination module 205 can map the training documents 255, which are categorized by the reviewers to pre-defined classes (e.g., privileged, responsive, confidential, relevant, etc.), into a feature vector space. Testing documents determination module 205 can map the training documents 255 into the feature vector space by extracting one or more features from each training document 255 and assigning identifiers to the features in a feature vector. Once all of the training documents have been mapped to a feature vector, testing documents determination module 205 can send the feature vectors for the training documents to a near duplicate engine (not shown) and/or a concept cluster engine (not shown), and receive testing documents from the engine(s) based on the feature vectors. In one embodiment, testing documents determination module 205 can store the determined testing documents in testing documents 260.

Class determination module 210 can determine a class for each of testing documents 260. In one embodiment, class determination module 210 determines the class for each testing document 260 by supplying the testing document to an SVM engine (not shown) that has been built using a machine learning kernel and receiving the class as an output from the SVM engine. The SVM engine may be the combination of the machine learning kernel, the parameters for the machine learning kernel, and the set of training documents used to train the predictive coding system, such as predictive coding server 110. The SVM engine can be built by the predictive coding system through the process of identifying the best kernel and the best parameters for a given set of training documents. In an alternate embodiment, class determination module 210 determines the class for each testing document 260 by supplying the testing document directly to the machine learning kernel and receiving the class as an output from the machine learning kernel. The class can be based on the classes that categorize the plurality of training documents 255. Class determination module 210 can send the determined class to goodness of fit evaluation module 215. In one embodiment, the machine kernel determines the class of the selected document using a set of default parameters values for the machine learning kernel. In an alternate embodiment, the selected machine kernel determines the class of the selected document using values other than the default values (e.g., defined by a user) for the parameters for the machine learning kernel.

Goodness of fit evaluation module 215 can evaluate a goodness of fit of a machine learning kernel for a testing document 260 based on a class for the testing document 260 received from class determination module 210. Goodness of fit evaluation module 215 may evaluate the goodness of fit of the machine learning kernel by determining the centroid of the testing documents 260, determining the distance of the point representing each testing document 260 from the centroid, and applying a goodness of fit test to the distances.

Machine learning kernel selector 220 can select a most effective machine learning kernel from a plurality of evaluated machine learning kernels. Machine learning kernel selector 220 can select the most effective machine learning kernel by calculating the overall goodness of fit for each of the machine learning kernels, comparing the overall goodness of fit for each of the machine learning kernels, and selecting the machine learning kernel with the greatest overall goodness of fit value as the most effective machine learning kernel.

Parameter value determination module 225 can determine a value for at least one of a plurality of parameters for the most effective machine learning kernel. As described above, each machine learning kernel is evaluated using default values for a plurality of parameters. Once the machine learning kernel is selected by machine learning kernel selector 220, values for the parameters for the selected machine learning kernel can be selected to optimize the selected machine learning kernel for training documents 255 and testing documents 260, as well as the remainder documents 265.

In one embodiment, parameter value determination module 225 determines the values of the parameters by selecting different values for the parameters, calculating a goodness of fit for the selected machine learning kernel using each value of each parameter, and selecting the combination of values for the parameters that have the highest (best) goodness of fit. In an alternate embodiment, parameter value determination module 225 determines the values of the parameters by selecting different values for the parameters, calculating a goodness of fit for the selected machine learning kernel using each value of each parameter, and selecting the value of each parameter that has the highest goodness of fit for that parameter.

Figure 3:
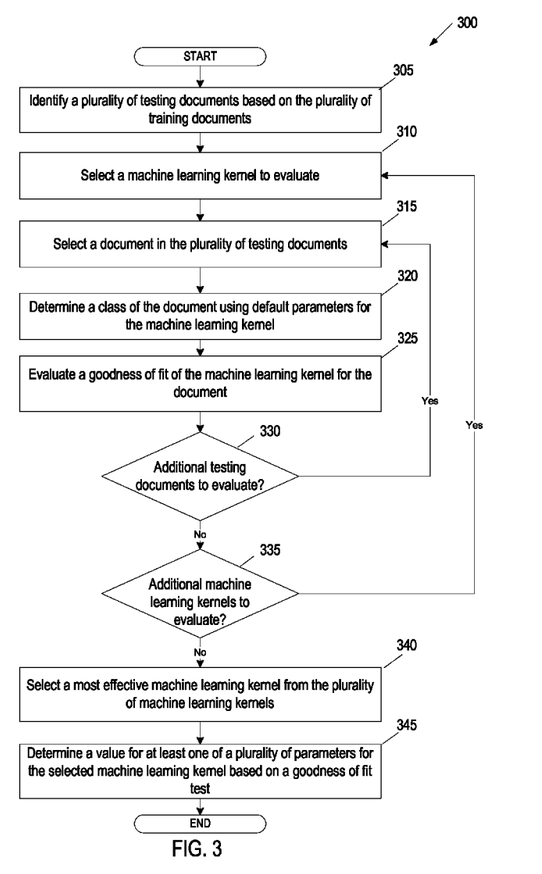
FIG. 3 is a flow diagram illustrating an embodiment for a method of selecting the most effective machine learning kernel from a training set of documents, in accordance with an embodiment.

FIG. 3 is a flow diagram of an embodiment of a method 300 for selecting the most effective machine learning kernel from a training set of documents. The method 300 is performed by processing logic that may comprise hardware (circuitry, dedicated logic, etc.), software (such as is run on a general purpose computer system or a dedicated machine), or a combination of both. In one embodiment, the method 300 is performed by the predictive coding server 110 of FIG. 1. The method 300 may be performed by a kernel selection module 120 running on predictive coding server 110 or another machine.

At block 305, processing logic identifies a plurality of testing documents based on a plurality of training documents. The training documents can be a subset of electronic discovery documents that are selected for machine learning. The remaining documents (outside of the training set) can be evaluated to determine if they should be added to the plurality of testing documents. The plurality of testing documents can be used to evaluate the effectiveness of a machine learning kernel. In one embodiment, the plurality of testing documents includes documents that are near-duplicates of the plurality of training documents. In one embodiment, the plurality of testing documents includes documents that are in the same concept-cluster as the plurality of training documents. One embodiment of identifying a plurality of test documents based on the plurality of training documents is described in greater detail below in conjunction with FIG. 4.

At block 310, processing logic selects a machine learning kernel to evaluate. The machine learning kernel may be selected from a group of machine kernels available to the processing logic. Examples of the machine learning kernel can include, but are not limited to, linear, polynomial, radial basis function, sigmoid, 3-nearest neighbor, tangent distance, LeNet, and translation invariant. In one embodiment, each machine learning kernel is selected only once, such that a machine learning kernel that has been selected to be evaluated is not selected again.

At block 315, a document in the plurality of testing documents is selected to use to evaluate the selected machine learning kernel. At block 320, a class of the selected document is determined. In one embodiment, the class of the selected document is determined by supplying the document to an SVM engine that has been built using the selected machine learning kernel and receiving the class as an output from the SVM engine. In an alternate embodiment, the class of the selected document is determined by supplying the document directly to the selected machine learning kernel and receiving the class as an output from the machine learning kernel. The classes can be based on the classes that categorize the plurality of training documents. The classes can be defined by the one or more reviewers that reviewed and categorized the plurality of training documents. Examples of classes can include, but are not limited to, confidential, not confidential, relevant, not relevant, privileged, not privileged, responsive, not responsive, etc. In one embodiment, the selected machine kernel determines the class of the selected document using a set of default parameter values for the machine learning kernel. In an alternate embodiment, the selected machine kernel determines the class of the selected document using values other than the default values (e.g., defined by a user) for the parameters for the machine learning kernel.

At block 325, a goodness of fit of the machine learning kernel is evaluated for the document based on the class outputted by the machine learning kernel. The goodness of fit of the machine learning kernel may be evaluated for the document by determining the centroid of the plurality of testing documents, determining the distance of the point representing the document from the centroid, and applying a goodness of fit test to the distance.

In one embodiment, the centroid is determined based on clustering points, such that the aggregate distance of each point from the centroid is the smallest. In this embodiment, the centroid can be determined by repeated application of a clustering algorithm. In one embodiment, the k-means clustering algorithm is used to determine the centroid. In other embodiments, other clustering algorithms that are well known in the art may be used to determine the centroid. In one embodiment, the distance of the point representing the document from the centroid is determined by measuring the distance using the Euclidean distance formula.

The goodness of fit test can measure the variance (or discrepancy) between class values predicted by the machine learning kernel 160 and the class values predicted by the testing document's classification based on its relation to a training document (near duplicate or concept cluster). In one embodiment, the goodness of fit test uses a chi-squared test. In an alternate embodiment, the goodness of fit test uses a Kolmogorov-Smirnov test. In another alternate embodiment, the goodness of fit test uses a Cramer-von Mises criterion. In yet another alternate embodiment, the goodness of fit test uses an Anderson-Darling test. In some embodiments, the goodness of fit of the machine learning kernel is evaluated for the documents by other methods commonly known in the art.

At block 330, a determination is made of whether additional testing documents need to be evaluated. The determination can be made by determining if all testing documents have been evaluated. If there is an additional testing document that needs to be evaluated, the method proceeds to block 315 to select the next document in the plurality of testing documents. If there are no additional testing documents that need to be evaluated, the method proceeds to block 335.

At block 335, a determination is made of whether additional machine learning kernels need to be evaluated. The determination can be made by determining if all machine learning kernels have been evaluated. If there is an additional machine learning kernel that needs to be evaluated, the method proceeds to block 310 to select the next machine learning kernel to evaluate. If there are no additional machine learning kernels that need to be evaluated, the method proceeds to block 340.

At block 340, a most effective machine learning kernel is selected from the plurality of machine learning kernels. The machine learning kernel can be selected by calculating the overall goodness of fit for each of the machine learning kernels, comparing the overall goodness of fit for each of the machine learning kernels, and selecting the machine learning kernel with the greatest overall goodness of fit value as the most effective machine learning kernel.

In one embodiment, the overall goodness of fit for each machine learning kernel is determined by 1) summing the variances for each document measured by the goodness of fit test for the document using the machine learning kernel and 2) applying a goodness of fit test to the sum of the variances. In one embodiment, the variances are summed by class, such that each class of documents (e.g., confidential, not confidential, relevant, not relevant, privileged, not privileged, responsive, not responsive, etc.) has its own summed variance value. In an alternate embodiment, the variances are summed overall, such that there is a single summed variance value for the entire plurality of testing documents. The variance for each document is based on the application of the goodness of fit test to the machine learning kernel, as described above.

A goodness of fit test can be applied to the sum of the variances to determine an overall goodness of fit for the machine learning kernel. The goodness of fit test (or evaluation) used can be selected from one of a chi-squared test, a Kolmogorov-Smirnov test, a Cramer-von Mises test, an Anderson-Darling test, or any other goodness of fit test known in the art. In one embodiment, the same goodness of fit test that was used to evaluate the plurality of testing documents is used to determine a goodness of fit for the machine learning kernels. In an alternate embodiment, a different goodness of fit test than the one used to evaluate the plurality of testing documents is used to determine a goodness of fit for the machine learning kernels. If the chi-squared test is used to determine the goodness of fit for the plurality of testing documents, a degree of freedom may be computed, which is one less than the number of classes. In some embodiments, if the probability of observations is less than the chi-squared value for that degree of freedom, the machine learning kernel is considered a good fit.

The overall goodness of fit for the machine learning kernels are compared, and the machine learning kernel with the greatest goodness of fit value is selected.

At block 345, a value for at least one of a plurality of parameters for the selected most effective machine learning kernel is determined based on a goodness of fit test. As described above, the machine learning kernel is evaluated using default values for a plurality of parameters. Once the machine learning kernel is selected, values for the parameters for the selected machine learning kernel can be selected to optimize the selected most effective machine learning kernel for the training documents and testing documents, as well as the remaining electronic discovery documents.

The parameters whose values need to be selected can include nu, width, degree, coefficient, epsilon, and cost. The nu parameter is a number of positive and negative samples, the width parameter is a margin width for the classifier, the coefficient parameter is a kernel coefficient for the polynomial and sigmoid kernels, the epsilon parameter is the epsilon loss function in epsilon SVR, and cost is the cost parameter for misclassifying each training document. The parameters can modify the application of the predefined kernel function used by the selected machine learning kernel. For example, the cost function parameter can control how much error weight the selected machine learning kernel should assign for each misclassified point. In another example, the Gamma function parameter can be used to modify the curvature of the decision plane, and can modify the fit of the majority of the data in the training set in the decision plane.

In one embodiment, the values of the parameters are determined by selecting different values for the parameters, calculating a goodness of fit for the selected machine learning kernel using each value of each parameter, calculating a goodness of fit for each combination of values for the parameters, and selecting the combination of values for the parameters that have the highest (best) goodness of fit. In an alternate embodiment, the values of the parameters can be determined by selecting different values for the parameters and evaluating the machine learning kernel using each value of each parameter. The machine learning kernel can be evaluated by determining a class of each testing document and evaluating a goodness of fit of the machine learning kernel for each testing document as described above. Processing logic can select the value of each parameter that results in the highest goodness of fit for the selected most effective machine learning kernel.

In some embodiments, the values of the parameters are selected using a step function. In one embodiment, 4-6 steps are used for each parameter, with each step representing a different value for the parameter. For example, if the RBF kernel is selected, one of the parameters for the RBF kernel is the RBF width parameter. In this example, four values for the RBF width parameter are stepped through (ex: 0.2, 0.4, 0.5, 0.6, and 0.8). If the 0.4 value of the RBF width parameter causes the highest goodness of fit value, the 0.4 value can be selected as the value for the RBF width parameter.

Figure 4:
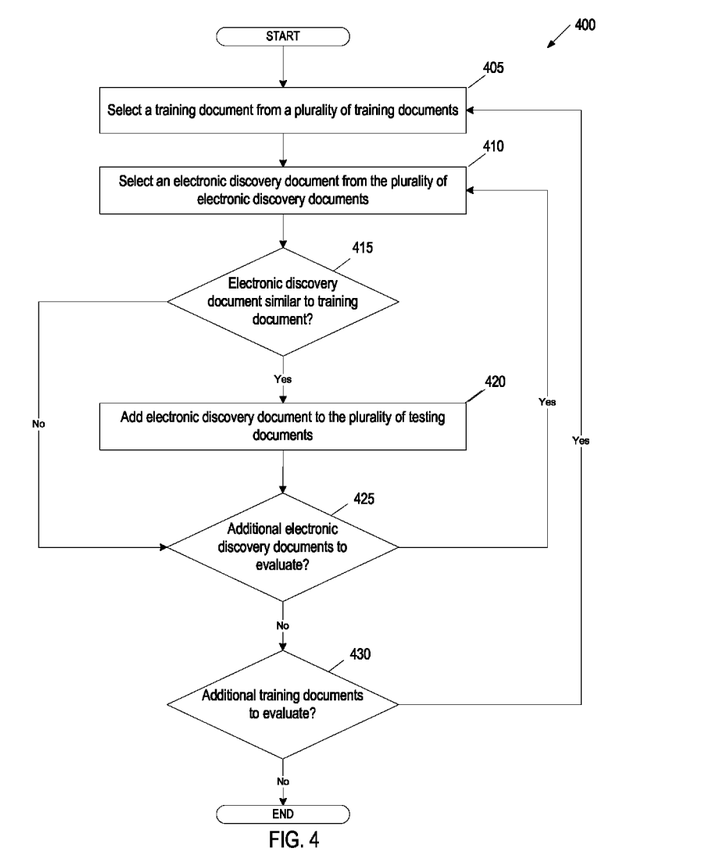
FIG. 4 is a flow diagram illustrating an embodiment for a method of identifying a plurality of test documents based on a plurality of training documents, in accordance with an embodiment.

FIG. 4 is a flow diagram of an embodiment of a method 400 for identifying a plurality of test documents based on a plurality of training documents. The method 400 is performed by processing logic that may comprise hardware (circuitry, dedicated logic, etc.), software (such as is run on a general purpose computer system or a dedicated machine), or a combination of both. In one embodiment, the method 400 is performed by the predictive coding server 110 of FIG. 1. The method 400 may be performed by a kernel selection module 120 running on predictive coding server 110 or another machine.

At block 405, processing logic selects a training document from the plurality of training documents. The training documents can be a subset of electronic discovery documents that are selected for machine learning. In one embodiment, each training document in the plurality of training documents is selected once, such that a training document that has been selected and evaluated is not selected again.

At block 410, processing logic selects an electronic discovery document from the plurality of electronic discovery documents. In one embodiment, only the electronic discovery documents outside of the training set are selected from.

At block 415, processing logic determines if the selected electronic discovery document is similar to the selected training document. In one embodiment, processing logic determines if the selected electronic discovery document is similar to the selected training document by submitting the selected electronic discovery document and the selected training document to a near-duplicate engine. In this embodiment, the near-duplicate engine determines if the selected electronic discovery document is a near-duplicate of the selected training document and sends the determination to the processing logic. In an alternate embodiment, processing logic determines if the selected electronic discovery document is similar to the selected training document by submitting the selected electronic discovery document and the selected training document to a concept-cluster engine. In this embodiment, the concept-cluster engine determines if the selected electronic discovery document is in the concept-cluster of the selected training document and sends the determination to the processing logic.

In one embodiment, prior to sending the selected electronic discovery document and the selected training document to an engine (e.g., near-duplicate engine, concept cluster engine, etc.), processing logic evaluates the selected training document to determine whether the selected electronic discovery document is similar to the selected training document. In this embodiment, the selected electronic discovery document and the selected training document, which is categorized by the reviewers to pre-defined classes (e.g., privileged, responsive, confidential, relevant, etc.), are mapped into a feature vector space. Processing logic can map the selected electronic discovery document and the selected training document into the feature vector space by extracting one or more features from the documents. The features extracted may be dependent on the type of document being analyzed. For example, an email training document may include the features of sender, recipient, subject, and body, while an office document (e.g., word processing document, etc.) may include the features of title, author, headings, and content. Processing logic can then assign an identifier to each feature in a feature vector. For example, a vector for an email training document may be: (sender, recipient, subject, body). For example, a vector for an email training document may be: (title, author, heading1, heading2, content). Once the selected electronic discovery document and the selected training document have been mapped to a feature vector, processing logic can send the feature vector for the selected electronic discovery document and the feature vector for the selected training document to a near duplicate engine and/or a concept cluster engine.

The near-duplicate engine can determine that the selected electronic discovery document is a near-duplicate of the selected training document if a predefined percentage of features in the selected electronic discovery document are identical to the features of the selected training document. In one embodiment, the predefined percentage is selected by a user, such as an administrator of the predictive coding system, a reviewer, etc. In one example, a predefined percentage of features is set to 75%, the selected (email) training document has a sender "George," a recipient "Bob," a subject "Application for review," and a body "Please find attached an application for your review," and the selected electronic discovery document being analyzed for being a near duplicate includes a sender "George," a recipient "Bob," a subject "Document for review," and body "Please find attached an application for your review." In this example, the near-duplicate engine would determine that the selected electronic discovery document is a near-duplicate of the selected training document because 75% of the features (3 out of 4 features) of the selected electronic discovery document are identical to the features of the selected training document. In another example, the selected electronic discovery document includes a sender "George," a recipient "Steve," a subject "Document for review," and a body "Please find attached an application for your review." In this example, the near-duplicate engine would determine that the selected electronic discovery document is not a near-duplicate of the selected training document because only 50% (2 out of 4 features) are identical to the selected training document.

The concept-cluster engine can determine that the selected electronic discovery document is in the concept-cluster of the selected training document if the selected electronic discovery document has the same concept, same subject, or same topic as the selected training document. In one example, the selected training document includes information about the San Francisco 49ers football team and the selected electronic discovery document includes information about the New York Giants football team. In this example, the concept-cluster engine can determine that the selected electronic discovery document is in the concept-cluster of the selected training document because the selected electronic discovery document includes information about the same concept, football. In another example, the selected training document includes information about the San Francisco 49ers football team and the selected electronic discovery document includes information about the San Francisco Giants team. In this example, the concept-cluster engine can determine that the selected electronic discovery document is in the concept-cluster of the selected training document because the selected electronic discovery document includes information about the same topic, San Francisco sports teams.

If the selected electronic discovery document is determined to be not similar to the selected training document, processing logic proceeds to block 425. If the selected electronic discovery document is determined to be similar to the selected training document, processing logic proceeds to block 420.

At block 420, the electronic discovery document is added to the plurality of testing documents. The electronic discovery document can be added to the plurality of testing documents by including an identifier for the electronic discovery document in the plurality of testing documents.

At block 425, a determination is made of whether additional electronic discovery documents need to be evaluated. The determination can be made by determining if all electronic discovery documents (other than the plurality of training documents) have been evaluated. If there is an electronic discovery document that needs to be evaluated, the method proceeds to block 410 to select the next electronic discovery document in the plurality of electronic discovery documents. If there are no additional electronic discovery documents that need to be evaluated, the method proceeds to block 430.

At block 430, a determination is made of whether additional training documents need to be evaluated. The determination can be made by determining if all training documents have been evaluated. If there is an additional training document that needs to be evaluated, the method proceeds to block 405 to select the next training document. If there are no additional training documents that need to be evaluated, the method ends.

Figure 5:
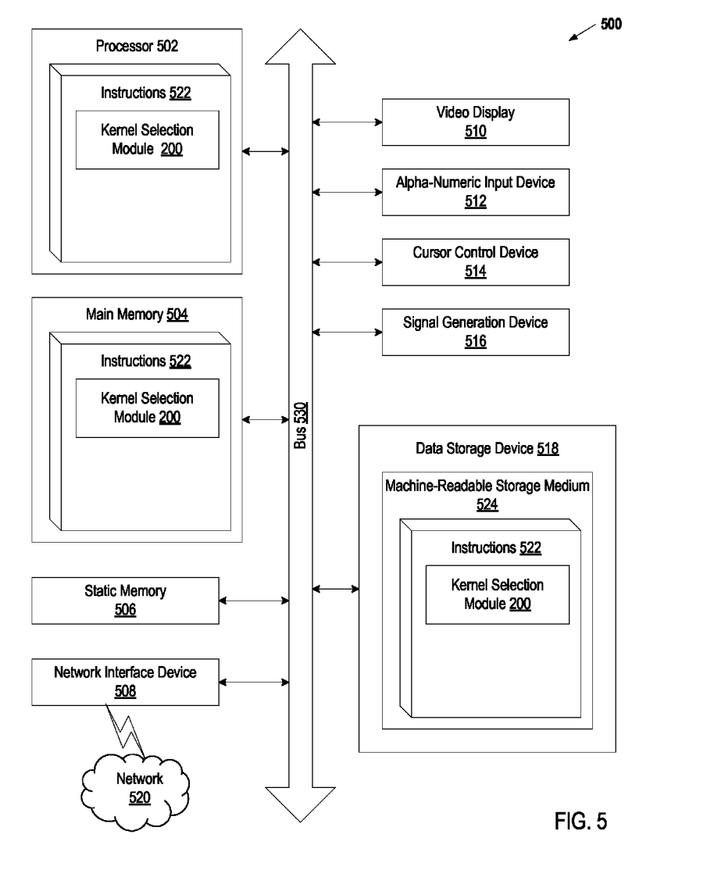
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 524 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a kernel selection module (e.g., kernel selection module 200 of FIG. 2) and/or a software library containing methods that call a kernel selection module. While the computer-readable storage medium 524 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "presenting", "updating", "determining", "executing," "providing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying, by a processing device at a server computing system, a plurality of testing documents in a plurality of electronic discovery documents based on a plurality of training documents;
   for each machine learning kernel in a plurality of machine learning kernels:
      for each testing document in the plurality of testing documents, determining a class of the testing document using a default value for each of a plurality of parameters for the machine learning kernel, and evaluating a goodness of fit of the machine learning kernel for the testing document,
      summing a variance for each testing document in the plurality of testing documents for the machine learning kernel, wherein the variance is based on the goodness of fit of the machine learning kernel for the testing document, and
      applying a goodness of fit test to the summed variance to determine an overall goodness of fit of the machine learning kernel;
   comparing the overall goodness of fit of each of the plurality of machine learning kernels;
   selecting a particular machine learning kernel from the plurality of machine learning kernels that has a greatest overall goodness of fit; and
   selecting a particular value for at least one of the plurality of parameters for the particular machine learning kernel using a goodness of fit test.

2. The method of claim 1, wherein the plurality of machine learning kernels comprises at least two of a linear kernel, a polynomial kernel, a radial basis function (RBF) kernel, a sigmoid kernel, a three nearest neighbor kernel, a tangent distance kernel, a LeNet kernel, or a translation invariant kernel.

3. The method of claim 1, wherein the plurality of parameters comprise at least one of nu, width, degree, coefficient, epsilon, or cost.

4. The method of claim 1, wherein identifying the plurality of testing documents comprises:
   for each training document in the plurality of training documents:
      for each electronic discovery document in the plurality of electronic discovery documents:
         determining whether the electronic discovery document is similar to the training document; and
         upon determining that the electronic discovery document is similar to the training document, including the electronic discovery document in the plurality of testing documents.

5. The method of claim 4, wherein determining that the electronic discovery document is similar to the training document comprises:
   extracting a plurality of features of the training document; and
   determining that the electronic discovery document is a near-duplicate of the training document based on the extracted plurality of features.

6. The method of claim 4, wherein determining that the electronic discovery document is similar to the training document comprises:
   extracting a plurality of features of the training document; and
   determining that the electronic discovery document is a concept cluster of the training document based on the extracted plurality of features.

7. The method of claim 1, wherein the goodness of fit test comprises a parameter goodness of fit test, and wherein selecting the particular value comprises:
   for each parameter in the plurality of parameters for the particular machine learning kernel:
      for each value in a plurality of values for the parameter, determining a parameter goodness of fit for the particular machine learning kernel using the value for the parameter; and
   selecting the particular value from the plurality of values that has a greatest parameter goodness of fit.

8. A non-transitory computer readable storage medium having instructions that when executed by a processing device, cause the processing device to perform operations comprising:
   identifying, by the processing device at a server computing system, a plurality of testing documents in a plurality of electronic discovery documents based on a plurality of training documents;
   for each machine learning kernel in a plurality of machine learning kernels:
      for each testing document in the plurality of testing documents, determining a class of the testing document using a default value for each of a plurality of parameters for the machine learning kernel, and evaluating a goodness of fit of the machine learning kernel for the testing document;
   selecting a particular machine learning kernel from the plurality of machine learning kernels;
   for each parameter in the plurality of parameters for the particular machine learning kernel:

for each value in a plurality of values for the parameter, determining a parameter goodness of fit for the particular machine learning kernel using the value for the parameter; and selecting a particular value from the plurality of values that has a greatest parameter goodness of fit for at least one of the plurality of parameters for the particular machine learning kernel.

9. The non-transitory computer readable storage medium of claim 8, wherein identifying the plurality of testing documents comprises:

for each training document in the plurality of training documents:
for each electronic discovery document in the plurality of electronic discovery documents:
determining whether the electronic discovery document is similar to the training document; and
upon determining that the electronic discovery document is similar to the training document, including the electronic discovery document in the plurality of testing documents.

10. The non-transitory computer readable storage medium of claim 9, wherein determining that the electronic discovery document is similar to the training document comprises:

extracting a plurality of features of the training document; and determining that the electronic discovery document is a near-duplicate of the training document based on the extracted plurality of features.

11. The non-transitory computer readable storage medium of claim 9, wherein determining that the electronic discovery document is similar to the training document comprises:

extracting a plurality of features of the training document; and determining that the electronic discovery document is a concept cluster of the training document based on the extracted plurality of features.

12. The non-transitory computer readable storage medium of claim 8, wherein selecting the machine learning kernel comprises:

for each machine learning kernel in the plurality of machine learning kernels, determining an overall goodness of fit of the machine learning kernel, wherein determining the overall goodness of fit comprises summing a variance for each testing document in the plurality of testing documents for the machine learning kernel, wherein the variance is based on the goodness of fit of the machine learning kernel for the testing document, and applying a goodness of fit test to the summed variance;

comparing the overall goodness of fit of each of the plurality of machine learning kernels; and selecting the machine learning kernel from the plurality of machine learning kernels that has a greatest overall goodness of fit.

13. The non-transitory computer readable storage medium of claim 8, wherein the plurality of machine learning kernels comprises at least two of a linear kernel, a polynomial kernel, a radial basis function (RBF) kernel, a sigmoid kernel, a three nearest neighbor kernel, a tangent distance kernel, a LeNet kernel, or a translation invariant kernel, and wherein the plurality of parameters comprise at least one of nu, width, degree, coefficient, epsilon, or cost.

14. A system comprising:
a memory; and
a processing device at a server computing system to communicate with the memory to:

for each training document in a plurality of training documents and each electronic discovery document in a plurality of electronic discovery documents:
extract a plurality of features of the training document,
determine whether the electronic discovery document is similar to the training document by determining whether the electronic discovery document is a near-duplicate or a concept cluster of the training document based on the extracted plurality of features, and
upon the determination that the electronic discovery document is similar to the training document, include the electronic discovery document in a plurality of testing documents;

for each machine learning kernel in a plurality of machine learning kernels:
for each testing document in the plurality of testing documents, determine a class of the testing document using a default value for each of a plurality of parameters for the machine learning kernel, and evaluate a goodness of fit of the machine learning kernel for the testing document;

select a particular machine learning kernel from the plurality of machine learning kernels; and select a particular value for at least one of the plurality of parameters for the particular machine learning kernel using a goodness of fit test.

15. The system of claim 14, wherein to determine that the electronic discovery document is similar to the training document, the processing device is to:

determine that the electronic discovery document is the near-duplicate of the training document based on the extracted plurality of features.

16. The system of claim 14, wherein to determine that the electronic discovery document is similar to the training document, the processing device is to:

determine that the electronic discovery document is the concept cluster of the training document based on the extracted plurality of features.

17. The system of claim 14, wherein to select the machine learning kernel, the processing device is to:

for each machine learning kernel in the plurality of machine learning kernels, determine an overall goodness of fit of the machine learning kernel, wherein to determine the overall goodness of fit, the processing device is to:
sum a variance for each testing document in the plurality of testing documents for the machine learning kernel, wherein the variance is based on the goodness of fit of the machine learning kernel for the testing document; and
apply a goodness of fit test to the summed variance;

compare the overall goodness of fit of each of the plurality of machine learning kernels; and select the machine learning kernel from the plurality of machine learning kernels that has a greatest overall goodness of fit.

18. The system of claim 14, wherein the goodness of fit test comprises a parameter goodness of fit test, and wherein to select the particular value, the processing device is to:

for each parameter in the plurality of parameters for the particular machine learning kernel:
for each value in a plurality of values for the parameter, determine a parameter goodness of fit for the particular machine learning kernel using the value for the parameter; and select the particular value from the plurality of values that has a greatest parameter goodness of fit.

19. The system of claim 14, wherein the plurality of machine learning kernels comprises at least two of a linear kernel, a polynomial kernel, a radial basis function (RBF) kernel, a sigmoid kernel, a three nearest neighbor kernel, a tangent distance kernel, a LeNet kernel, or a translation invariant kernel.

20. The system of claim 14, wherein the plurality of parameters comprise at least one of nu, width, degree, coefficient, epsilon, or cost.

* * * * *